United States Patent
Gu et al.

(10) Patent No.: US 11,987,014 B2
(45) Date of Patent: May 21, 2024

(54) RESIN-BASED COMPOSITE MATERIAL OF THREE-LAYER STRUCTURE AND USE THEREOF

(71) Applicant: SOOCHOW UNIVERSITY, Suzhou (CN)

(72) Inventors: Aijuan Gu, Suzhou (CN); Guozheng Liang, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 363 days.

(21) Appl. No.: 17/423,257

(22) PCT Filed: Jan. 15, 2019

(86) PCT No.: PCT/CN2019/071833
§ 371 (c)(1),
(2) Date: Jul. 15, 2021

(87) PCT Pub. No.: WO2020/147020
PCT Pub. Date: Jul. 23, 2020

(65) Prior Publication Data
US 2022/0072817 A1    Mar. 10, 2022

(51) Int. Cl.
*B29C 70/62*  (2006.01)
*B29C 35/08*  (2006.01)
(Continued)

(52) U.S. Cl.
CPC .......... *B29C 70/62* (2013.01); *B29C 35/0805* (2013.01); *C08J 3/28* (2013.01);
(Continued)

(58) Field of Classification Search
CPC .............. B29C 70/62; B29C 35/0805; B29C 2035/0855; B29C 70/003; B29C 70/021;
(Continued)

(56) References Cited

U.S. PATENT DOCUMENTS

2018/0354232 A1* 12/2018 Fu ..................... C23C 18/1648
2019/0016644 A1* 1/2019 Liang ................. C04B 38/0615

FOREIGN PATENT DOCUMENTS

CN    102504449 A  *  6/2012
CN    102504449 A      6/2012
(Continued)

OTHER PUBLICATIONS

Witkowska, Polydopamine-Based Material and Their Potential in Head and Neck Cancer Therapy—Current State of Knowledge, Int. J. Mol. Sci. 2023, 24, 4890, Mar. 3, 2023 (Year: 2023).*

*Primary Examiner* — S. Behrooz Ghorishi
(74) *Attorney, Agent, or Firm* — SZDC Law PC

(57) ABSTRACT

This invention disclosed a resin-based composite material has a three-layer structure and the application thereof. According to the invention, an oriented carbon nanotube bundle/epoxy resin composite material (denoted as layer B) is prepared with the microwave curing method, a barium titanate nanofiber/epoxy resin composite material (denoted as layer E) is prepared by means of a blade coating-heat curing method, and a composite material of a B-E-B three layer structural is formed by means of a layer-by-layer curing technology. Compared to the composite material of the conductor-insulating layer/polymer layer structural prepared in the prior art, the resin-based composite material has a three-layer structure provided by the invention has with high energy storage density, and low dielectric loss and high permittivity; and the preparation process therefor is controllable and easy to operate, short in production cycle, and suitable for large-scale application.

9 Claims, 4 Drawing Sheets

(51) Int. Cl.
  *B29K 105/16* (2006.01)
  *B29K 507/04* (2006.01)
  *B29K 509/02* (2006.01)
  *B29L 9/00* (2006.01)
  *C08J 3/28* (2006.01)
  *C08J 5/04* (2006.01)
  *C08J 5/24* (2006.01)
  *C08L 63/00* (2006.01)

(52) U.S. Cl.
  CPC ............... *C08J 5/047* (2013.01); *C08J 5/242* (2021.05); *C08J 5/243* (2021.05); *C08L 63/00* (2013.01); *B29C 2035/0855* (2013.01); *B29K 2105/167* (2013.01); *B29K 2507/04* (2013.01); *B29K 2509/02* (2013.01); *B29L 2009/00* (2013.01); *C08J 2363/00* (2013.01); *C08J 2479/02* (2013.01)

(58) Field of Classification Search
  CPC ..... C08J 3/28; C08J 5/047; C08J 5/242; C08J 5/243; C08J 2363/00; C08J 2479/02; C08J 5/005; C08J 5/06; B29K 2105/167; B29K 2507/04; B29K 2509/02; C08L 63/00; B29L 2009/00; B32B 27/28
  See application file for complete search history.

(56) References Cited

FOREIGN PATENT DOCUMENTS

| | | | | | |
|---|---|---|---|---|---|
| CN | 107415118 | A | * | 12/2017 | ........... B29C 39/006 |
| CN | 107415118 | A | | 12/2017 | |
| CN | 107538661 | A | * | 1/2018 | |
| CN | 107538661 | A | | 1/2018 | |
| WO | 2017121204 | A1 | | 7/2017 | |

* cited by examiner

RESIN-BASED COMPOSITE MATERIAL OF THREE-LAYER STRUCTURE AND USE THEREOF

This application is the National Stage Application of PCT/CN2019/071833, filed on Jan. 15, 2019.

TECHNICAL FIELD

The invention relates to a resin-based composite material with high energy storage density, high permittivity (>1000, 100 Hz) and low dielectric loss (<0.6, 100 Hz) and its application, in particular to a resin-based composite material has a three-layer structure belongs to the technical field of dielectric functional composite materials.

BACKGROUND TECHNIQUE

With the increasing demand of pulse power equipment, electronic power system and compact, low-cost electrical appliances, there is an urgent need for electrical energy storage devices that can store and output energy instantaneously. Dielectric capacitor charge and discharge do not involve electrochemical reaction, and is generally solid, does not change shape, and has a high temperature, which is conducive to ensure the stable operation and service reliability of pulse power equipment and electronic power system. High performance dielectric energy storage materials are the core materials of dielectric capacitors. Polymer matrix composites with high permittivity have the advantages of light weight, easy processing and readjustedable dielectric properties, which are recognized as the most promising candidate materials for high performance dielectric capacitors.

The energy density of linear dielectric ($U_e$) is proportional to the permittivity of dielectric ($\varepsilon_r$) and the breakdown strength ($E_b$) of the dielectric. So far, polymer matrix composites generally cannot have both high permittivity and high breakdown strength. For example, in ceramic/polymer composite materials, even if the ceramic content is as high as 50 vol % or more, the permittivity is still less than 100, and there are many structural defects and low breakdown strength. In the conductor/polymer composite material, the seepage phenomenon is used to obtain a high permittivity, but its dielectric properties are very sensitive to the content of the conductor, and the dielectric loss is high (>1, @100 Hz), which is prone to breakdown and medium. The electric constant is also lower than 350.

In order to solve the above problems, in recent years, many types of multilayer structural composite materials have been prepared, but the permittivity of the multilayer structural composite materials reported in the existing literature are generally low (<350, @100 Hz), the process is complicated, and the cycle is longer.

Therefore, how to use a simple process to prepare high permittivity polymer matrix composites with low dielectric loss, high $E_b$ and $U_e$ high Ue are still very challenging task. In the functional filler, the aligned carbon nanotubes composed of many single carbon nanotubes interacting in a certain direction has excellent mechanical properties, electrical conductivity and dispersibility. Compared with other one-dimensional materials, it can improve the dielectric properties of the nanocomposite more effectively. However, when the content of aligned carbon nanotube bundles is high, the permittivity (265, @100 Hz) of the prepared polymer matrix composite material still needs to be further improved; at the same time, aligned carbon nanotube/resin composites also have the problems of high dielectric loss, low breakdown strength and low energy storage density.

Technical Problem

In order to overcome the shortcomings of the prior art, the present invention aims to provide a new type of resin composite material with high energy storage density, and low dielectric loss and high permittivity. And the preparation method of the controllable and easy preparation process, and the production cycle is short, for large-scale applications.

Technical Solution

In order to achieve the above object, the technical solution adopted by the present invention is:

A resin-based composite material has three-layer structure, which includes the following steps:
(1) Mixing up the curable resin system with the aligned carbon nanotubes to obtain the aligned carbon nanotubes prepolymer; the prepolymer is divided into the first prepolymer and the second prepolymer; then the first prepolymer is precured, to obtain the pre-cured sheet of the aligned carbon nanotubes;
(2) Mixing up the curable resin system with polydopamine-coated barium titanate nanofibers to obtain barium titanate nanofiber prepolymer; the barium titanate nanofiber prepolymer is made into a film and pre-cured to obtain barium titanate nanofiber prepolymer.
(3) The barium titanate nanofiber precured sheet is soaked in the second prepolymer and then laid flat on the aligned carbon nanotubes precured sheet; then the second prepolymer is poured on the barium titanate nanofiber precured sheet; and then cured to obtain a resin-based composite material has three-layer structure.

The invention also discloses a preparation method of the resin-based composite material has three-layer structure, which includes the following steps:
(1) Mixing up the curable resin system with the aligned carbon nanotubes to obtain the aligned carbon nanotubes prepolymer; the prepolymer is divided into the first prepolymer and the second prepolymer; then the first prepolymer is precured, to obtain the pre-cured sheet of the aligned carbon nanotubes;
(2) Mixing up the curable resin system with polydopamine-coated barium titanate nanofibers to obtain barium titanate nanofiber prepolymer; the barium titanate nanofiber prepolymer is made into a film and pre-cured to obtain barium titanate nanofiber prepolymer.
(3) The barium titanate nanofiber precured sheet is soaked in the second prepolymer and then laid flat on the aligned carbon nanotubes precured sheet; then the second prepolymer is poured on the barium titanate nanofiber precured sheet; and then cured to obtain a resin-based composite material has three-layer structure.

In the present invention, in step (1), the amount mass of aligned carbon nanotube bundle and the curable resin system is 0.1 to 2%, preferably 0.3 to 1%. The amount of the first and the second prepolymer are equal, the equal volume can also be equal mass; in step (2), the amount of polydopamine-coated barium titanate nanofibers is 10 to 40% of the mass of the curable resin system, preferably 15% to 25%, The addition amount of the inorganic material in the present invention is much lower than the prior art, but it is not obvious that the technical effect of achieving a breakdown strength of 4.92 is achieved.

In the present invention, the curable resin system comprises a resin or a resin and a curing agent; the curable resin system comprises a resin or a resin and a curing agent; the curable resin system and the curable resin system are the same or not. The present invention In order to distinguish between two terms, it means that the resin system can be cured under certain conditions (heating, light, microwave, etc.), reaching a degree of curing of nearly 100%. The resin system can be a single resin, a combination of several resins, or a combination of resin and corresponding curing agent. The resin includes bismaleimide resin, cyanate ester resin, epoxy resin, and polyimide. One or more of the resins, and the curing agent is conventionally selected according to the type of resin. Under the preparation method of the present invention, the technical effects of high energy storage density, low dielectric loss and high permittivity can be achieved; the so-called resin, curing agent of the present invention agent is a conventional term in the art.

In the present invention, the preparation method of the polydopamine coated barium titanate nanofiber includes the following steps:
① Mixing the barium salt and the titanate compound in a solvent, and then add a viscosity modifier to obtain a precursor solution; the precursor solution is electrospinned and calcined to obtain barium titanate nanofibers;
② Dopamine hydrochloride and trimethylol aminomethane hydrochloride are dissolved in water, and then the pH value is readjusted to 8 to 9 with alkaline solution; then barium titanate nanofibers are added to react to obtain polydopamine-coated barium titanate nanofibers.

In the technical solution above, the barium salt is barium acetate, the titanate compound is tetrabutyl titanate, the solvent is acetic acid, and the viscosity modifier is polyvinylpyrrolidone; the electrospinning parameter is 1.7 kV/cm; the calcination is at 10° C./min heating rate and is carried out at 700° C. for 3 h at air atmosphere; the lye is an aqueous sodium hydroxide solution; the reaction is shaking at room temperature for 24 h. The molar ratio of barium salt to titanate compound is 1; the mass ratio of dopamine hydrochloride, trimethylaminomethane hydrochloride, water and barium titanate nanofibers is 0.2:0.1:100:2.

In the present invention, the thickness of the barium titanate nanofiber pre-cured sheet is 50 to 1000 μm, preferably 150 to 300 μm; and the barium titanate nanofiber prepolymer is formed into a film by a coating method. The resin-based composite material has three-layer structure prepared in this way can ensure a high permittivity to the greatest extent, maintain a high permittivity even slightly increased, and significantly improve the breakdown strength.

In the present invention, the curing degree of the aligned carbon nanotubes pre-cured sheet is 30% to 60%; the curing degree of the barium titanate nanofiber pre-cured sheet is 30% to 60%. Degree of cure is a conventional term in the field. Pre-curing the raw materials can increase the dispersibility of inorganic components (carbon nanotube bundles, barium titanate nanofibers) at low viscosity, and avoid excessive fluidity during the final curing process. The problem of the instability of the resin-based composite material has three-layer structure, while limiting the prepolymer curing degree can also improve the curing effect between layers.

In the present invention, in step (1), the first prepolymer is pre-cured by microwave intermittent curing; in step (3), the microwave intermittent curing is used way to cure. Preferably, the microwave intermittent curing takes 10 to 30 seconds each time, and the intermittent time is 5 to 15 seconds. The present invention does not adopt the conventional thermal curing method in the field of resin curing, but adopts microwave intermittent curing, that is, microwave curing for a period of time, pause for a period of time, and then microwave curing-pause, continuous cycle, the total curing time is determined according to the resin system, so that the obtained three-layer structure resin-based composite material has a curing degree exceeding 97%.

The invention also discloses a application of resin-based composite material has three-layer structure in the preparation of a dielectric functional composite material.

The preparation of resin-based composite material has three-layer structure disclosed by the invention, includes the following steps: by mass.
(1) Mixing up 100 parts of the microwave-curable resin system with 0.1 to 2 parts of aligned carbon nanotube bundles, and prepolymerize to obtain prepolymer A;
(2) Taking the prepolymer A prepared in step (1) and divide it into two parts, and pre-curing half of them to obtain the aligned carbon nanotubes/resin pre-cured sheet B;
(3) Mixing up 100 parts of heat-curable resin system with 10 to 40 parts of polydopamine-coated barium titanate nanofibers, and prepolymerize to obtain prepolymer C; with a film applicator to scrape prepolymer C to 50 to 1000 μm thick prepolymer film D;
(4) Precuring the prepolymer film D prepared in step (3) to obtain a barium titanate nanofiber/thermosetting resin precured sheet E;
(5) After the pre-cured sheet E prepared in step (4) is soaked in the prepolymer A prepared in step (1), it is tiled on the aligned carbon nanotubes/resin pre-cured sheet B prepared in step (2) to obtain a double-layer structural composite Material B-E;
(6) Pouring the other half of the prepolymer A prepared in step (1) onto one side of the barium titanate nanofiber/thermosetting resin precured sheet E of the two-layer structural composite material B-E prepared in step (5), and then cures to obtain three-layer structure resin composite material B-E-B.

In the present invention, the aligned carbon nanotube bundles can be either untreated or surface treated.

In the present invention, the preparation method of the polydopamine coated barium titanate nanofiber includes the following steps:
① By molarity, mixing up one part barium acetate with one part tetrabutyl titanate dissolved in 10 parts acetic acid evenly. And add an appropriate amount of polyvinylpyrrolidone to readjusted the viscosity to form a stable precursor solution F; take the precursor solution F, electrospinning under 1.7 kV/cm, the end of electrostatic spinning, drying at 40° C. for 4 h to obtain as-spun composite nanofiber G; put as-spun composite nanofiber G in a muffle furnace under air atmosphere, the temperature is increased to 700° C. at a heating rate of 10° C./min, and calcined for 3 hours. After natural cooling, barium titanate nanofibers are obtained, which are recorded as BTnf.
② By mass, mixing up 0.2 parts dopamine hydrochloride with 0.1 parts tris-hydroxymethylaminomethane hydrochloride dissolved in 100 parts water to obtain solution H; dissolving 0.5 part of sodium hydroxide in 100 parts of water to obtain an aqueous sodium hydroxide solution; Adjust the pH to 8.5 with sodium hydroxide aqueous solution to obtain solution I; immerse 2 parts of barium titanate nanofibers in solution I and shaked at room temperature for 24 hours; after the reaction, take them out, wash and dry them to obtain polydopamine coated barium titanate nanofibers are denoted as PDA@BTnf.

The prepolymerization process, the pre-curing process, and the curing process of the present invention depend on the resin system used, the degree of prepolymerization is not particularly limited, the curing degree of the pre-curing is controlled to be 30%-60%, and the curing degree of curing is >97%.

Beneficial Effect

Compared with the prior art, the present invention has the following beneficial effects:

1. The present invention uses aligned carbon nanotube bundles and barium titanate nanofibers as functional bodies to design a novel three-layer structure resin-based composite material, which has both high energy storage density and high permittivity (>1000, @100 Hz) And low dielectric loss (<0.6, @100 Hz).
2. In the present invention, aligned carbon nanotube bundles are used as conductors and are cured by microwave curing, and the formed dielectric layer has a unique high permittivity. First, the unique tube bundle structural enables more microcapacitance structures to be formed inside the composite material to achieve a higher permittivity. Second, the curing time required for microwave curing is short, and the functional body can be well dispersed in the resin. Third, during the microwave irradiation process, the magnetic susceptibility and polarizability in the direction parallel to the axis of the aligned carbon nanotube bundle are different from the susceptibility and polarizability in the direction perpendicular to the axis of the aligned carbon nanotube bundle, and thus along the electromagnetic field direction orientation, that is, the functional body is aligned in a certain direction in the resin matrix, so the obtained carbon nanotube bundle resin-based material layer produces higher electric polarization and has a high permittivity.
3. Barium titanate has excellent dielectric energy storage properties, and the parallel arrangement of barium titanate nanofibers can achieve high breakdown strength at low addition levels. The invention uses the resin composite material in which the barium titanate nanofibers are arranged in parallel as the high breakdown strength layer, which ensures that the three-layer composite material has high breakdown strength. In addition, the barium titanate layer has a low permittivity, while the carbon nanotube bundle layer has a high permittivity. When an external electric field is applied, the difference in permittivity between the two layers increases, and the low permittivity layer will bear higher local electric field that relieves the electric field strength of the high permittivity layer and prevents the material from being completely broken down; and due to the local electric field redistribution, the three-layer structure composite material has a higher permittivity.
4. The barium titanate layer exists between the two carbon nanotube bundle layers, which can significantly limit the transfer of internal charges in the material, thereby playing a good role in reducing dielectric loss.
5. The three-layer structure resin-based composite material provided by the present invention has a controllable preparation process, is easy to mass-produce, and has a short cycle, and is suitable for large-scale applications; because the three-layer structure composite material has both high permittivity and high breakdown strength, gives the three-layer structure composite material excellent energy storage density.

EMBODIMENTS OF THE INVENTION

Figure 1:
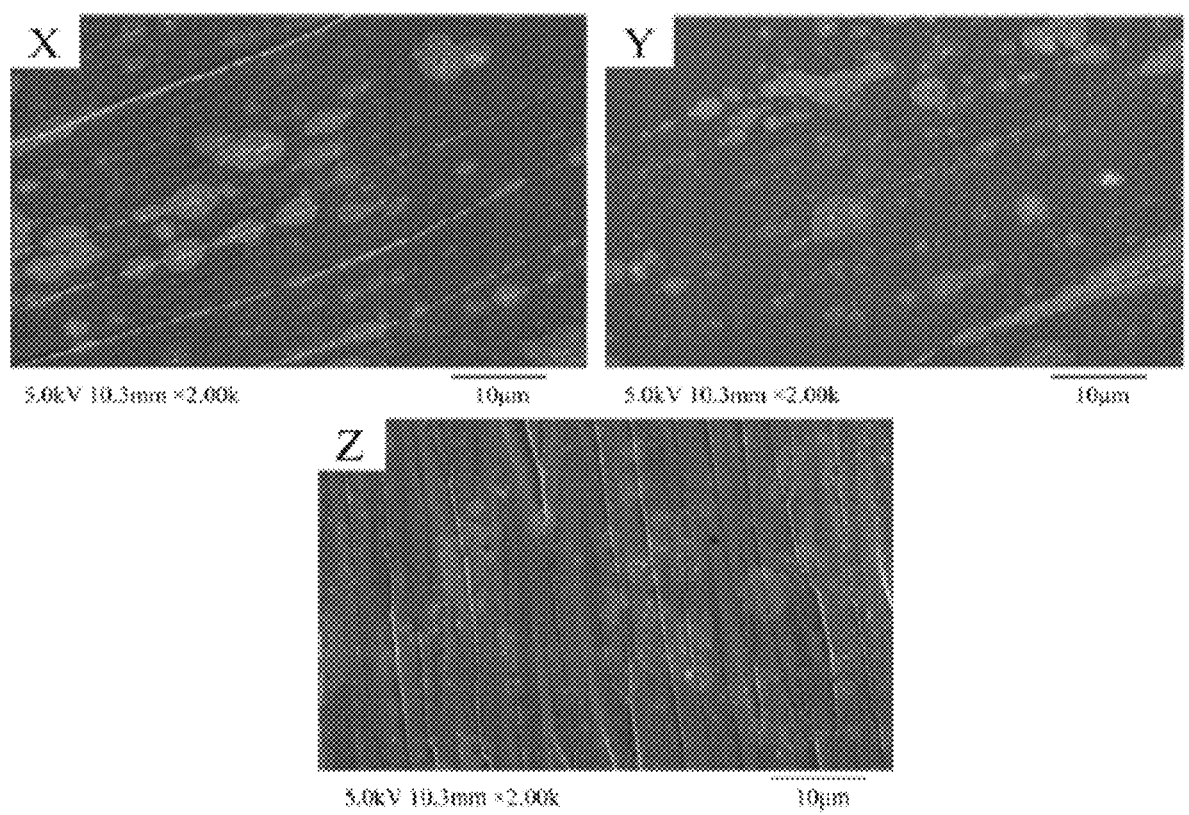
FIG. 1 is a scanning electron microscope (SEM) photograph of the resin-based composite material has three-layer structure provided in Example 1 of the present invention in the X, Y, and Z directions.

The technical scheme of the present invention will be further described below in conjunction with the drawings, embodiments and comparative examples.

Example 1

(1) Mixing up 0.12 g of aligned carbon nanotube bundles (length was 20 to 100 μm, diameter was 2 to 5 μm) without surface treatment with 20 g bisphenol A epoxy resin (brand NO. is E-51), dissolved at 60° C. for 10 minutes with ultrasonic vibration, and adding 0.8 g of 2-ethyl-4-methylimidazole, continue to stirring for 10 min, then vacuum degassed at 60° C. for 20 min to obtain prepolymer A; divided prepolymer A into two parts, which was the first prepolymer and the second prepolymer, poured the first prepolymer into the preheated mold, then putted the mold in a microwave oven and irradiated it for 5 cycles (the irradiation process for each cycle was medium heat, heated for 30 s, cold for 10 s), and after natural cooling, obtained the aligned carbon nanotube/epoxy cured resin composite pre-cured sheet B with 60% curing degree was.

(2) Magnetic stirring at 50° C., Mixing up 4.38 g of barium acetate with 5.84 g of tetrabutyl titanate, dissolved into acetic acid (20 mL) and mixed uniformly, and 5 g of polyvinylpyrrolidone was added to readjusted the viscosity to form a stable precursor solution F. The precursor solution F was electrospun at 1.7 kV/cm, and the spinning environment was constant temperature and humidity, where the temperature was 30° C. and the relative humidity was 50%. The electrospinning injection rate is 0.8 mL/h. The as-spun composite nanofiber G obtained by electrospinning was dried at 40° C. Then, put it in a muffle furnace under an air atmosphere, heat it up to 700° C. at a temperature rise rate of 10° C./min, and then heat it for 3 hours. After natural cooling, barium titanate nanofibers are obtained, denoted as BTnf.

(3) Dissolving 0.4 g of dopamine hydrochloride and 0.2 g of trimethylaminomethane hydrochloride in 200 mL water to obtain the solution H; dissolved 1 g of sodium hydroxide in 200 mL water to obtain sodium hydroxide aqueous solution; readjusted the pH to 8.5 of solution H with sodium hydroxide aqueous solution, to obtain solution I; added 4 g of BTnf into solution I, and the reaction was stirred at room temperature for 24 h; after the reaction, it was taken out, washed and dried to obtain polydopamine-coated barium titanate nanofibers, which were recorded as PDA@BTnf.

(4) Mixing up 4 g of PDA@BTnf with 20 g of bisphenol A epoxy resin (brand E-51), stirred with ultrasonic vibration at 60° C. for 10 minutes, added 0.8 g of 2-ethyl-4-methylimidazole, and continue to stirring with ultrasonic vibration 10 min, obtained prepolymer C; scraped the prepolymer film D with a 200 μm thickness on the preheated PTFE board, cured it at 80° C. for 1 h, and after natural cooling, to obtain a curing degree of 60% Barium titanate nanofiber/epoxy resin composite material pre-cured sheet E.

(5) After the pre-cured sheet E prepared in step (4) was soaked in the prepolymer A (the second prepolymer) prepared in step (1), it was tiled on the pre-cured sheet B prepared in step (1), and bubbles were removed to obtain Double-layer structural composite material B-E; then the other half of the prepolymer A prepared in step (1) was poured on the side of the pre-cured sheet E of the double-layer structural composite material B-E, and then the mold is placed in a microwave oven and irradiated 15 times Three cycles (the irradiation process of each cycle is medium heat, heating for 30 seconds, and cooling for 10 seconds). After natural cooling, a three-layer structure resin-based composite material with a curing degree>97% is obtained, which is recorded as B-E-B. Scanning electron micrograph of aligned carbon nanotube bundle distribution in B-E-B, scanning electron micrograph of barium titanate nanofiber distribution, scanning electron micrograph of the interface between layers, conductivity-frequency curve, permittivity-frequency curve, dielectric loss— The frequency curve, breakdown strength, and energy storage density are shown in FIGS. 1, 2, 3, 4, 5, 6, 7, and 8, respectively.

As shown in FIG. 1, which is a scanning electron microscope photograph of aligned carbon nanotube bundles distributed in an epoxy resin matrix in a B-E-B three-layer resin-based composite material provided in Example 1 of the present invention, where X, Y, and Z in the figure indicate respectively scanning electron microscope images in X, Y, and Z directions. It can be seen that the distribution of aligned carbon nanotube bundles in the epoxy resin is not random, but is evenly dispersed and arranged regularly, and is more inclined to be arranged along the Z direction.

Figure 2:
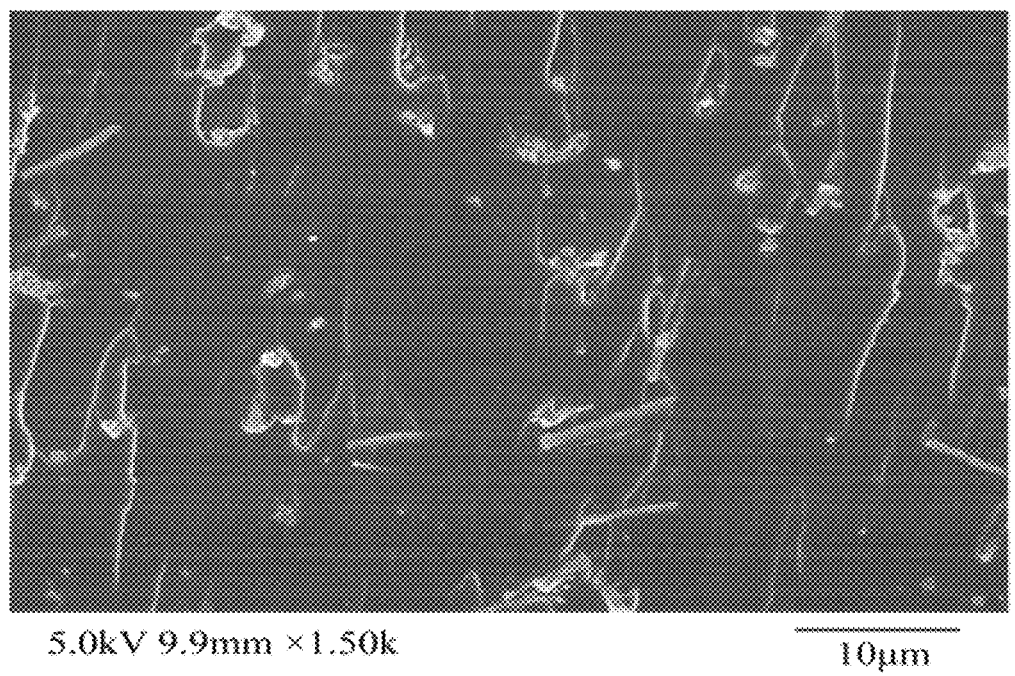
FIG. 2 is a scanning electron microscope photograph of the barium titanate nanofiber/epoxy composite material and the layer-to-layer interface of the three-layer composite resin-based composite material provided in Example 1 of the present invention.

As shown in FIG. 2, which is a scanning electron micrograph of the distribution of barium titanate nanofibers in epoxy resin in the B-E-B three-layer resin-based composite material provided in Example 1 of the present invention. Barium titanate nanofibers are evenly dispersed, but their arrangement tends to be aligned in the horizontal direction.

Figure 3:
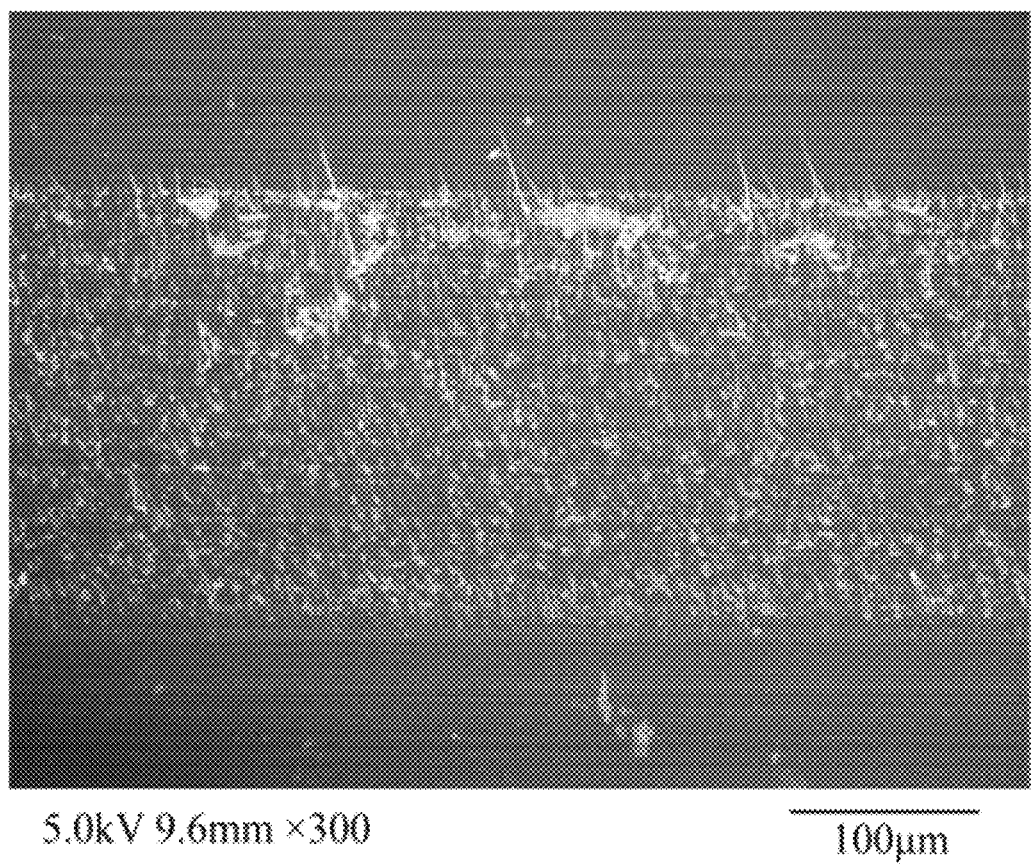
FIG. 3 is a scanning electron micrograph of the interface between the three-layer structure resin-based composite material layer and the layer provided in Example 1 of the present invention.

As shown in FIG. 3, which is a scanning electron micrograph of the interface between the B-E-B three-layer structure resin-based composite material layer and the layer provided in Example 1 of the present invention. It can be seen that the interlayer bonding is good, and there are no defects such as voids.

Comparative 1 Preparation of Aligned Carbon Nanotube Bundle/Epoxy Resin Composite Material Mixing 0.12 g of aligned carbon nanotube bundles (length was 20 to 100 μm, diameter was 2 to 5 μm) without surface treatment with 20 g bisphenol A epoxy resin (brand NO. is E-51), then dissolved at 60° C. for 10 minutes with ultrasonic vibration, added 0.8 g of 2-ethyl-4-methylimidazole, continue to stir for 10 minutes, then vacuum degassed at 60° C. for 20 minutes to obtain prepolymer A; poured prepolymer A into the preheated mold. Then putted the mold in a microwave oven and irradiated it for 15 cycles (the irradiation process for each cycle was medium heat, heated for 30 s, and cold for 10 s). After that, aligned carbon nanotubes/epoxy resin with a curing degree of >97% were obtained. Composite material, denoted as ACB/EP; its conductivity-frequency curve, permittivity-frequency curve, dielectric loss-frequency curve, breakdown strength, and energy storage density were as shown in FIGS. 4, 5, 6, 7 and 8, respectively.

Comparative 2 Preparation of Barium Titanate Nanofiber/Epoxy Resin Composite Material Mixing up 4 g of the polydopamine-coated barium titanate nanofibers PDA@BTnf was prepared in Example 1 with 20 g of bisphenol A epoxy resin (brand NO. was E-51), dissolved at 60° C. under ultrasonic vibration for 10 minutes, added 0.8 g of 2-ethyl-4-methylimidazole, continue to stirring for 10 minutes, then vacuum degassed at 60° C. for 20 minutes to obtain prepolymer A; poured prepolymer A into the preheated mold and putted it in the oven, then solidify according to the process of 80° C./2 h+100° C./2 h+120° C., and post-treatment at 150° C. for 4 h, after natural cooling, a barium titanate nanofiber/epoxy resin with a degree of solidification >97% was obtained, denoted as BTnf/EP. The conductivity-frequency curve, permittivity-frequency curve, and dielectric loss-frequency curve were shown in FIGS. 4, 5, and 6, respectively.

Comparative 3 Preparation of Aligned Carbon Nanotube Bundle/Barium Titanate Nanofiber/Epoxy Resin Composite Material Mixing 0.12 g of aligned carbon nanotube bundles (length was 20 to 100 μm, diameter was 2 to 5 μm) without surface treatment with 4 g of the polydopamine-coated barium titanate nanofibers PDA@BTnf was prepared in Example 1 and 20 g of bisphenol A epoxy resin (brand NO. was E-51), dissolved at 60° C. under ultrasonic vibration for 10 minutes, added 0.8 g of 2-ethyl-4-methylimidazole, continue to stirring for 10 minutes, then vacuum degassed at 60° C. for 20 minutes to obtain prepolymer A; poured prepolymer A into the preheated mold and putted it in the oven, then solidify according to the process of 80° C./2 h+100° C./2 h+120° C., and post-treatment at 150° C. for 4 h, after natural cooling, the aligned carbon nanotube bundle/barium titanate nanofiber/epoxy resin with a degree of solidification >97% was obtained, denoted as ACB/BTnf/EP. The conductivity-frequency curve, permittivity-frequency curve, and dielectric loss-frequency curve, breakdown strength and energy storage density were shown in FIGS. 4, 5, 6, 7 and 8, respectively.

Comparative 4 Preparation of Double-Layer Structural ([ACB/EP]$_2$)

Mixing 0.12 g of aligned carbon nanotube bundles (length was 20 to 100 μm, diameter was 2 to 5 μm) without surface treatment with 20 g bisphenol A epoxy resin (brand NO. is E-51), then dissolved at 60° C. for 10 minutes with ultrasonic vibration, added 0.8 g of 2-ethyl-4-methylimidazole, continue to stirring for 10 minutes, then vacuum degassed at 60° C. for 20 minutes to obtain prepolymer A; divided prepolymer A into two parts, poured the first prepolymer into the preheated mold, then putted the mold in a microwave oven and irradiated it for 5 cycles (the irradiation process for each cycle was medium heat, heated for 30 s, cold for 10 s), and after natural cooling, obtained the aligned carbon nanotube/epoxy cured resin composite pre-cured sheet B with 60% curing degree was. Then poured the other prepolymer A was prepared in step (1) onto the prepolymer B. And then putted the mould in a microwave oven and irradiated it for 15 cycles (the irradiation process for each cycle was medium heat, heated for 30 s, and cold for 10 s). After that, aligned carbon nanotubes/epoxy resin with a curing degree of >97% were obtained. Composite material, denoted as [ACB/EP]$_2$; its conductivity-frequency curve, permittivity-frequency curve, dielectric loss-frequency curve, breakdown strength, energy storage density were as shown in FIGS. 4, 5, 6, 7 and 8, respectively.

Figure 4:
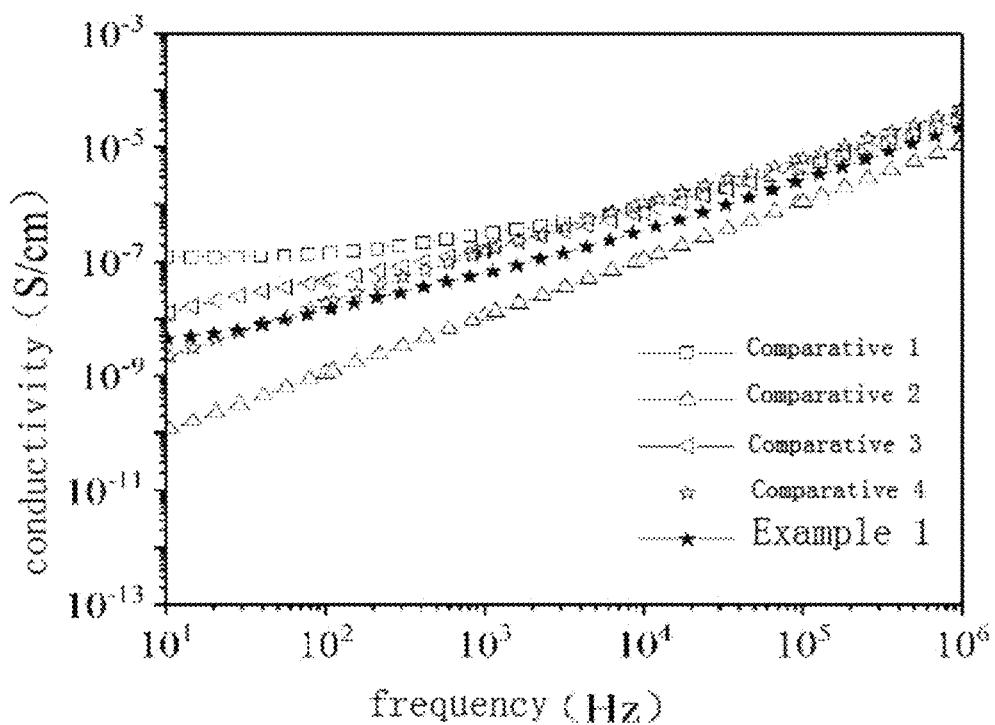
FIG. 4 is the resin-based composite material has three-layer structure provided in Example 1 of the present invention, an aligned carbon nanotube bundle/epoxy composite material provided in Comparative 1, and a barium titanate nanofiber/epoxy resin composite material provided in Comparative 2 The conductivity-frequency curve of the aligned carbon nanotube bundle/barium titanate nanofiber/epoxy composite material provided by Comparative 3 and the double-layer structural composite material ([ACB/EP]$_2$) provided by Comparative 4.

As shown in FIG. 4, which is the B-E-B three-layer resin-based composite material in Example 1 of the present invention, the aligned carbon nanotube bundle/epoxy resin composite material (ACB/EP) provided by Comparative 1, and Comparative 2 Barium titanate nanofiber/epoxy resin (BTnf/EP) composite material, the aligned carbon nanotube bundle/barium titanate nanofiber/epoxy resin (ACB/BTnf/EP) composite material provided by Comparative 3 and Comparative 4 The conductivity-frequency curve of the provided double-layer structural composite material ([ACB/EP]$_2$). It can be seen that the ACB/EP composite material provided by Comparative 1, the BTnf/EP composite material provided by Comparative 2, the ACB/BTnf/EP composite material provided by Comparative 3, and the double-layer structural composite material provided by Comparative 4 ([ACB/EP]$_2$) The electrical conductivity of the B-E-B composite material provided in Example 1 reaches $10^{-7}$, $10^{-11}$, $10^{-9}$, $10^{-9}$, $10^{-10}$, orders of magnitude (@1 Hz), respectively. The electrical conductivity of the B-E-B composite material provided in Example 1 is the lowest. This is because the presence of the polydopamine-coated barium titanate nanofiber/epoxy resin composite material layer has an obstructive effect on the conductive path inside the composite material and reduces the composite material. Leakage of materials.

Figure 5:
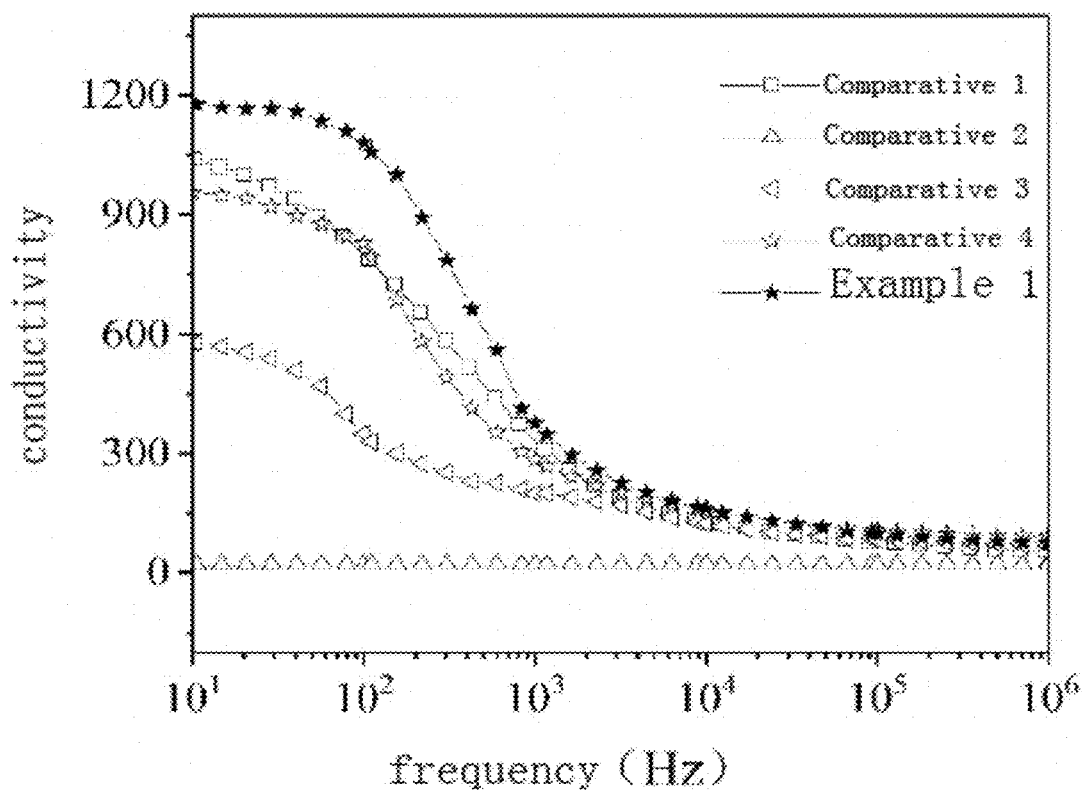
FIG. 5 is the resin-based composite material has three-layer structure provided in Example 1 of the present invention, an aligned carbon nanotube bundle/epoxy composite material provided in Comparative 1, and a barium titanate nanofiber/epoxy composite material provided in Comparative 2 The permittivity-frequency curve of the aligned carbon nanotube bundle/barium titanate nanofiber/epoxy composite material provided by Comparative 3 and the double-layer structural composite material ([ACB/EP]$_2$) provided by Comparative 4.

As shown in FIG. 5, which is the B-E-B three-layer resin-based composite material in Example 1 of the present invention, the aligned carbon nanotube bundle/epoxy resin composite material (ACB/EP) provided in Comparative 1, and Comparative 2 Barium titanate nanofiber/epoxy resin (BTnf/EP) composite material, the aligned carbon nanotube bundle/barium titanate nanofiber/epoxy resin (ACB/BTnf/EP) composite material provided by Comparative 3 and Comparative 4 Provide the permittivity-frequency curve of the double-layer structural composite material ([ACB/EP]$_2$). It can be seen that the B-E-B composite material provided in Example 1 has the highest permittivity. At 100 Hz, the ACB/EP composite material provided by Comparative 1, the BTnf/EP composite material provided by Comparative 2, the ACB/BTnf/EP composite material provided by Comparative 3, and the double-layer structural composite material provided by Comparative 4 ([ACB/EP]$_2$) The permittivitys of the B-E-B composite materials provided in Example 1 are 797.6, 21.1, 350.4, 828, 1080.9, respectively. Among them, the permittivity value of the B-E-B composite material provided in Example 1 is the optimal value, which is higher than the value reported so far for the conductor/polymer multilayer composite material containing an insulating layer; the BTnf/EP composite material provided in Comparative 2 The permittivity of the material is the worst value, 21.1 (@100 Hz). If barium titanate nanofibers are used directly instead of polydopamine-coated barium titanate nanofibers, the permittivity is 16.9 (@100 Hz).

Barium titanate nanofibers are ceramic functional bodies, and the BTnf/EP composite material provided by Comparative 2 has the lowest permittivity when the addition amount is 20 wt %. Compared with the ACB/EP composite material provided by Comparative 1, the presence of barium titanate nanofibers in the ACB/BTnf/EP composite material provided by Comparative 3 blocks the formation of the conductive network of aligned carbon nanotube bundles, so its medium permittivity is much lower than that of Comparative 1.

Compared with the ACB/EP composite material provided in Comparative 1, the double-layer structural composite material ([ACB/EP]$_2$) provided by Comparative 4 has one more interface layer, which has a stronger interface polarization effect, so the permittivity Slightly higher. The B-E-B composite material provided in Example 1 has a higher permittivity, which is due to the existence of two interface layers and space charge polarization. In addition, the conductivity of the aligned carbon nanotube bundle/epoxy resin composite layer (layer A) and barium titanate nanofiber/ epoxy resin composite layer (layer B) are $10^{-7}$ and $10^{-11}$ (@1 Hz), respectively. There will be more charge accumulation between their layers than between $[ACB/EP]_2$ layers, resulting in more significant interface polarization. Therefore, the permittivity of the B-E-B composite material provided in Example 1 is greatly improved. On the other hand, the difference in the permittivity between the aligned carbon nanotube bundle/epoxy composite layer and the barium titanate nanofiber/epoxy composite layer leads to a redistribution of local electric field intensity when the composite material is in an electric field. The low barium titanate nanofiber/epoxy composite material layer (21.1, @100 Hz) is polarized under a higher electric field, and the degree of electric polarization is higher, so the permittivity of the B-E-B composite material will increase.

Figure 6:
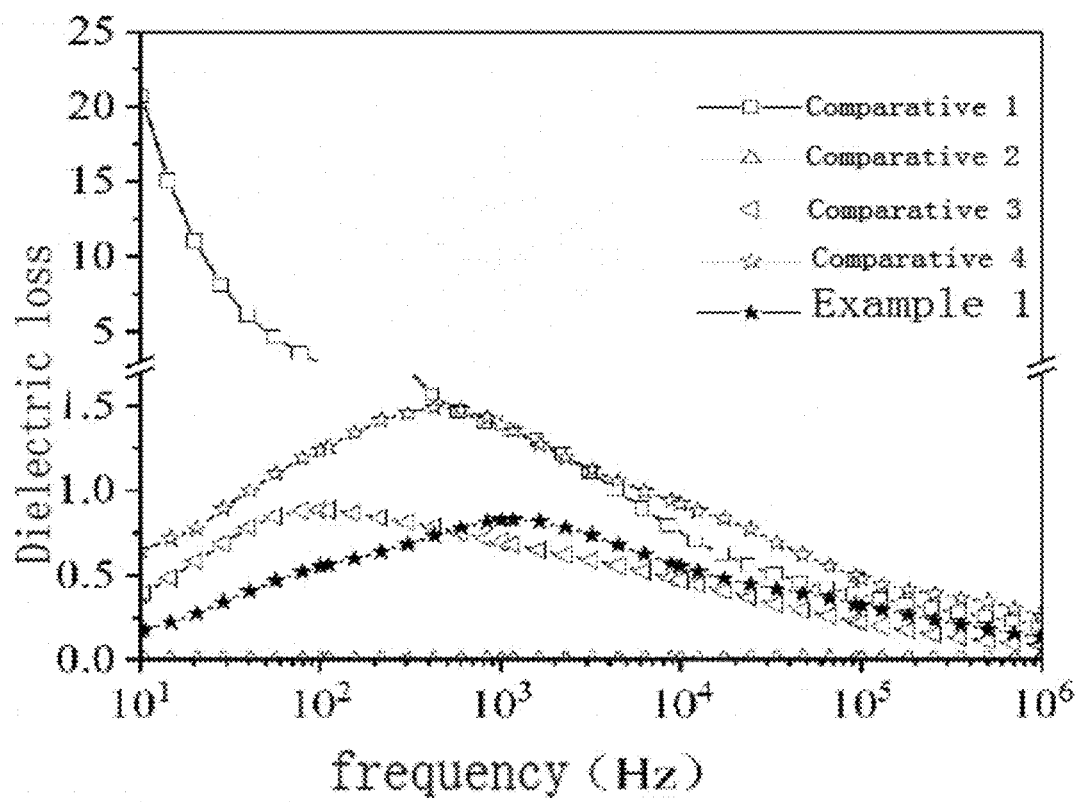
FIG. 6 is the resin-based composite material has three-layer structure provided in Example 1 of the present invention, an aligned carbon nanotube bundle/epoxy resin composite material provided in Comparative 1, and a barium titanate nanofiber/epoxy resin composite material provided in Comparative 2 The dielectric loss-frequency curve of the aligned carbon nanotube bundle/barium titanate nanofiber/epoxy composite material provided by Comparative 3 and the double-layer structural composite material ([ACB/EP]$_2$) provided by Comparative 4.

As shown in FIG. 6, which is the three-layer resin-based composite material B-E-B composite material provided in Example 1 of the present invention, the aligned carbon nanotube bundle/epoxy resin composite material (ACB/EP) provided in Comparative 1, and Barium titanate nanofiber/ epoxy resin (BTnf/EP) composite material in Comparative 2, the aligned carbon nanotube bundle/barium titanate nanofiber/epoxy resin (ACB/BTnf/EP) composite material provided by Comparative 3 and Comparative 4 The dielectric loss-frequency curve of the provided double-layer structural composite material ($[ACB/EP]_2$). It can be seen that the dielectric loss of the B-E-B resin-based composite material provided in Example 1 is lower than that of the ACB/EP composite material provided in Comparative 1. The B-E-B composite material provided in Example 1 contains barium titanate nanofibers/epoxy. The resin composite material layer has the lowest dielectric loss (0.59, @100 Hz), which can significantly limit the transfer of internal charges in the material and play a good role in reducing dielectric loss.

Figure 7:
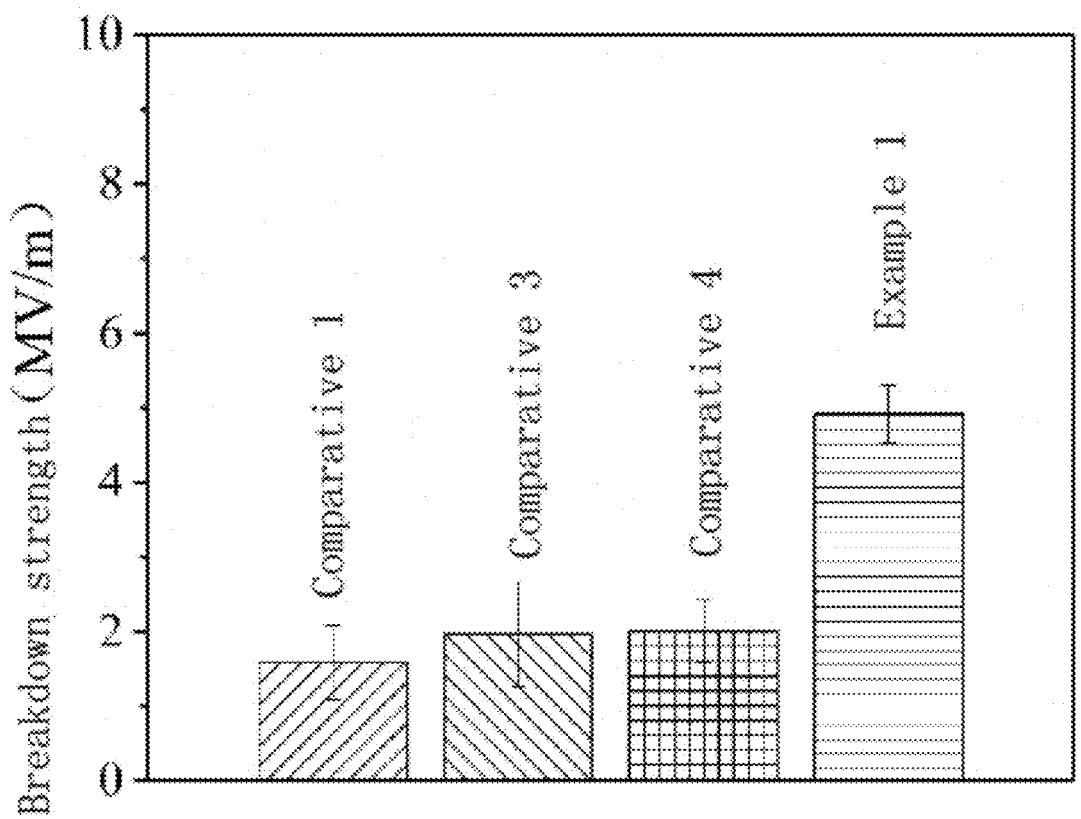
FIG. 7 is the resin-based composite material has three-layer structure provided in Example 1 of the present invention, an aligned carbon nanotube bundle/epoxy resin composite material provided in Comparative 1, and an aligned carbon nanotube bundle/barium titanate nanofiber/The breakdown strength of the epoxy resin composite material and the double-layer structural composite material provided by Comparative 4 ([ACB/EP]$_2$).

As shown in FIG. 7, which is the three-layer resin-based composite material B-E-B composite material provided by Example 1 of the present invention, the aligned carbon nanotube bundle/epoxy resin composite material (ACB/EP) provided by Comparative 1, and Comparative 2 Barium titanate nanofiber/epoxy resin (BTnf/EP) composite material, the aligned carbon nanotube bundle/barium titanate nanofiber/epoxy resin (ACB/BTnf/EP) composite material provided by Comparative 3 and Comparative 4 The breakdown strength diagram of the provided double-layer structural composite material ($[ACB/EP]_2$). It can be seen that the breakdown strength of the B-E-B composite material provided in Example 1 reached at 4.92, which is 2.5 times the breakdown strength of the ACB/BTnf/EP composite material provided in Comparative 3. This is because the breakdown path in B-E-B is long. Due to the existence of the intermediate interface layer, the breakdown path is extended. In particular, when an electric field is applied, after the local electric field intensity is redistributed, the barium titanate nanofiber/epoxy composite material layer with a small permittivity can withstand a higher electric field than the aligned carbon nanotube bundle/epoxy resin composite material layer The electric field intensity of the aligned carbon nanotube bundle/epoxy resin composite material layer with high permittivity is relatively small, which reduces the probability of breakdown, thereby increasing the breakdown strength of the B-E-B composite material. It is beneficial to increase the energy storage density of the multilayer structural composite material. Therefore, the three-layer structure resin matrix composite material shows the advantage of adjusting the local electric field intensity distribution.

Figure 8:
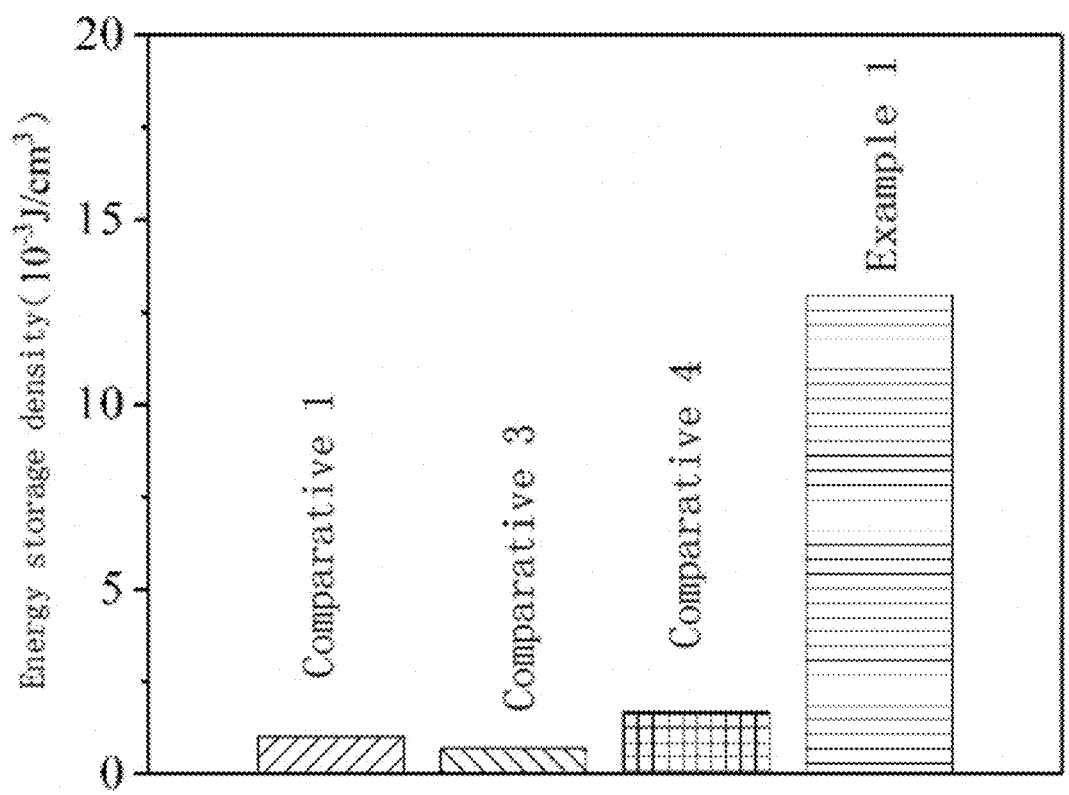
FIG. 8 is the resin-based composite material has three-layer structure provided in Example 1 of the present invention, an aligned carbon nanotube bundle/epoxy resin composite material provided in Comparative 1, and an aligned carbon nanotube bundle/barium titanate nanofiber/The energy storage density of the epoxy resin composite material and the double-layer structural composite material ([ACB/EP]2) provided by Comparative 4.

As shown in FIG. 8, which is the three-layer resin-based composite material B-E-B composite material provided by Example 1 of the present invention, the aligned carbon nanotube bundle/epoxy resin composite material (ACB/EP) provided by Comparative 1, and Comparative 2 Barium titanate nanofiber/epoxy resin (BTnf/EP) composite material, the aligned carbon nanotube bundle/barium titanate nanofiber/epoxy resin (ACB/BTnf/EP) composite material provided by Comparative 3 and Comparative 4 The energy storage density of the provided double-layer structural composite material ($[ACB/EP]_2$). It can be seen that the B-E-B composite material provided in Example 1 has the highest energy storage density, which are the ACB/EP composite material provided in Comparative 1, the ACB/BTnf/EP composite material provided in Comparative 3, and the double-layer provided in Comparative 4. The energy storage density of structural composite materials ($[ACB/EP]_2$) is 12.8, 18.8 and 7.7 times. This is because the energy storage density of linear materials is proportional to the square of the permittivity and breakdown strength of the composite material. Therefore, the B-E-B three-layer structure composite material can obtain a high energy storage density with the highest permittivity and breakdown strength. These data indicate that the present invention can produce composite materials with low dielectric loss, high permittivity and high breakdown strength through structural and composition design, thereby obtaining materials with high energy storage density.

Example 2

(1) Mixing up 0.02 g of aligned carbon nanotube bundles (length was 20 to 100 μm, diameter was 2 to 5 μm) without surface treatment with 20 g bisphenol A epoxy resin (brand NO. is E-51), dissolved at 60° C. for 10 minutes with ultrasonic vibration, and adding 0.8 g of 2-ethyl-4-methylimidazole, continue to stirring for 10 min, then vacuum degassed at 60° C. for 20 min to obtain prepolymer A; divided prepolymer A into two parts, poured the first prepolymer into the preheated mold, then putted the mold in a microwave oven and irradiated it for 5 cycles (the irradiation process for each cycle was medium heat, heated for 30 s, cold for 10 s), and after natural cooling, obtained the aligned carbon nanotube/epoxy cured resin composite pre-cured sheet B with 60% curing degree was.

(2) Mixing up 2 g of the polydopamine-coated barium titanate nanofibers PDA@BTnf was prepared in Example 1 with 20 g of bisphenol A epoxy resin (brand NO. was E-51), dissolved at 60° C. under ultrasonic vibration for 10 minutes, added 0.8 g of 2-ethyl-4-methylimidazole, continue to stirring for 10 minutes, then vacuum degassed at 60° C. for 20 minutes to obtain prepolymer C; scraped prepolymer film D with a thickness of 160 μm on the preheated polytetrafluoroethylene board, after curing for 1 h at 80° C., natural cooling, a barium titanate nanofiber/epoxy resin composite pre-cured sheet E with a curing degree of 60% is obtained.

(3) Soaking the pre-cured sheet E prepared in step (2) with the prepolymer A prepared in step (1), laid it flat on the pre-cured sheet B prepared in step (1) to remove air bubbles to obtain a two-layer structural composite material B-E; Then pour the other half of the prepolymer A prepared in step (1) on the side of the pre-cured sheet E of the double-layer structural composite material B-E, and then put the mold in a microwave oven, and irradiated it for 15 cycles (the irradiation process for each cycle was medium heat, heated for 30 s, cold for 10 s). After natural cooling, a three-layer structure resin-based composite material with a curing degree>97% was obtained, which is recorded as B-E-B.

Example 3

(1) Mixing up 0.12 g of aligned carbon nanotube bundles (length was 20 to 100 μm, diameter was 2 to 5 μm) without surface treatment with 20 g bisphenol A epoxy resin (brand NO. is E-51), dissolved at 60° C. for 10 minutes with ultrasonic vibration, and adding 0.8 g of 2-ethyl-4-methylimidazole, continue to stirring for 10 min, then vacuum degassed at 60° C. for 20 min to obtain prepolymer A; divided prepolymer A into two parts, poured the first prepolymer into the preheated mold, then putted the mold in a microwave oven and irradiated it for 5 cycles (the irradiation process for each cycle was medium heat, heated for 30 s, cold for 10 s), and after natural cooling, obtained the aligned carbon nanotube/epoxy cured resin composite pre-cured sheet B with 60% curing degree was.
(2) Mixing up 6 g of the polydopamine-coated barium titanate nanofibers PDA@BTnf was prepared in Example 1 with 20 g of bisphenol A epoxy resin (brand NO. was E-51), dissolved at 60° C. under ultrasonic vibration for 10 minutes, added 0.8 g of 2-ethyl-4-methylimidazole, continue to stirring for 10 minutes, then vacuum degassed at 60° C. for 20 minutes to obtain prepolymer C; scraped prepolymer film D with a thickness of 180 μm on the preheated polytetrafluoroethylene board, after curing for 1 h at 80° C., natural cooling, a barium titanate nanofiber/epoxy resin composite pre-cured sheet E with a curing degree of 60% is obtained.
(3) Soaking the pre-cured sheet E prepared in step (2) with the prepolymer A prepared in step (1), laid it flat on the pre-cured sheet B prepared in step (1) to remove air bubbles to obtain a two-layer structural composite material B-E; Then pour the other half of the prepolymer A prepared in step (1) on the side of the pre-cured sheet E of the double-layer structural composite material B-E, and then put the mold in a microwave oven, and irradiated it for 15 cycles (the irradiation process for each cycle was medium heat, heated for 30 s, cold for 10 s). After natural cooling, a three-layer structure resin-based composite material with a curing degree>97% was obtained, which is recorded as B-E-B.

Example 4

(1) Mixing up 0.12 g of aligned carbon nanotube bundles (length was 20 to 100 μm, diameter was 2 to 5 μm) without surface treatment with 20 g bisphenol A epoxy resin (brand NO. is E-51), dissolved at 60° C. for 10 minutes with ultrasonic vibration, and adding 0.8 g of 2-ethyl-4-methylimidazole, continue to stirring for 10 min, then vacuum degassed at 60° C. for 20 min to obtain prepolymer A; divided prepolymer A into two parts, poured the first prepolymer into the preheated mold, then putted the mold in a microwave oven and irradiated it for 5 cycles (the irradiation process for each cycle was medium heat, heated for 30 s, cold for 10 s), and after natural cooling, obtained the aligned carbon nanotube/epoxy cured resin composite pre-cured sheet B with 60% curing degree was.
(2) Mixing up 8 g of the polydopamine-coated barium titanate nanofibers PDA@BTnf was prepared in Example 1 with 20 g of bisphenol A epoxy resin (brand NO. was E-51), dissolved at 60° C. under ultrasonic vibration for 10 minutes, added 0.8 g of 2-ethyl-4-methylimidazole, continue to stirring for 10 minutes, then vacuum degassed at 60° C. for 20 minutes to obtain prepolymer C; scraped prepolymer film D with a thickness of 210 μm on the preheated polytetrafluoroethylene board, after curing for 1 h at 80° C., natural cooling, a barium titanate nanofiber/epoxy resin composite pre-cured sheet E with a curing degree of 60% is obtained.
(3) Soaking the pre-cured sheet E prepared in step (2) with the prepolymer A prepared in step (1), laid it flat on the pre-cured sheet B prepared in step (1) to remove air bubbles to obtain a two-layer structural composite material B-E; Then pour the other half of the prepolymer A prepared in step (1) on the side of the pre-cured sheet E of the double-layer structural composite material B-E, and then put the mold in a microwave oven, and irradiated it for 15 cycles (the irradiation process for each cycle was medium heat, heated for 30 s, cold for 10 s). After natural cooling, a three-layer structure resin-based composite material with a curing degree>97% was obtained, which is recorded as B-E-B.

Example 5

(1) Mixing up 0.11 g of aligned carbon nanotube bundles (length was 20 to 100 μm, diameter was 2 to 5 μm) without surface treatment with 20 g bisphenol A epoxy resin (brand NO. is E-51), dissolved at 60° C. for 10 minutes with ultrasonic vibration, and adding 0.8 g of 2-ethyl-4-methylimidazole, continue to stirring for 10 min, then vacuum degassed at 60° C. for 20 min to obtain prepolymer A; divided prepolymer A into two parts, poured the first prepolymer into the preheated mold, then putted the mold in a microwave oven and irradiated it for 5 cycles (the irradiation process for each cycle was medium heat, heated for 30 s, cold for 10 s), and after natural cooling, obtained the aligned carbon nanotube/epoxy cured resin composite pre-cured sheet B with 60% curing degree was.
(2) Mixing up 4 g of the polydopamine-coated barium titanate nanofibers PDA@BTnf was prepared in Example 1 with 20 g of bisphenol A epoxy resin (brand NO. was E-51), dissolved at 60° C. under ultrasonic vibration for 10 minutes, added 0.8 g of 2-ethyl-4-methylimidazole, continue to stirring for 10 minutes, then vacuum degassed at 60° C. for 20 minutes to obtain prepolymer C; scraped prepolymer film D with a thickness of 400 μm on the preheated polytetrafluoroethylene board, after curing for 1 h at 80° C., natural cooling, a barium titanate nanofiber/epoxy resin composite pre-cured sheet E with a curing degree of 60% is obtained.
(3) Soaking the pre-cured sheet E prepared in step (2) with the prepolymer A prepared in step (1), laid it flat on the pre-cured sheet B prepared in step (1) to remove air bubbles to obtain a two-layer structural composite material B-E; Then pour the other half of the prepolymer A prepared in step (1) on the side of the pre-cured sheet E of the double-layer structural composite material B-E, and then put the mold in a microwave oven, and irradiated it for 15 cycles (the irradiation process for each cycle was medium heat, heated for 30 s, cold for 10 s). After natural cooling, a three-layer structure resin-based composite material with a curing degree>97% was obtained, which is recorded as B-E-B.

Example 6

(1) Mixing up 0.15 g of aligned carbon nanotube bundles (length was 20 to 100 μm, diameter was 2 to 5 μm) without surface treatment with 20 g bisphenol A epoxy resin (brand NO. is E-51), dissolved at 60° C. for 10 minutes with ultrasonic vibration, and adding 0.8 g of 2-ethyl-4-methylimidazole, continue to stirring for 10 min, then vacuum degassed at 60° C. for 20 min to obtain prepolymer A; divided prepolymer A into two parts, poured the first prepolymer into the preheated mold, then putted the mold in a microwave oven and irradiated it for 5 cycles (the irradiation process for each cycle was medium heat, heated for 30 s, cold for 10 s), and after natural cooling, obtained the aligned carbon nanotube/epoxy cured resin composite pre-cured sheet B with 60% curing degree was.

(2) Mixing up 3.5 g of the polydopamine-coated barium titanate nanofibers PDA@BTnf was prepared in Example 1 with 20 g of bisphenol A epoxy resin (brand NO. was E-51), dissolved at 60° C. under ultrasonic vibration for 10 minutes, added 0.8 g of 2-ethyl-4-methylimidazole, continue to stirring for 10 minutes, then vacuum degassed at 60° C. for 20 minutes to obtain prepolymer C; scraped prepolymer film D with a thickness of 200 μm on the preheated polytetrafluoroethylene board, after curing for 1 h at 80° C., natural cooling, a barium titanate nanofiber/epoxy resin composite pre-cured sheet E with a curing degree of 60% is obtained.

(3) Soaking the pre-cured sheet E prepared in step (2) with the prepolymer A prepared in step (1), laid it flat on the pre-cured sheet B prepared in step (1) to remove air bubbles to obtain a two-layer structural composite material B-E; Then pour the other half of the prepolymer A prepared in step (1) on the side of the pre-cured sheet E of the double-layer structural composite material B-E, and then put the mold in a microwave oven, and irradiated it for 15 cycles (the irradiation process for each cycle was medium heat, heated for 30 s, cold for 10 s). After natural cooling, a three-layer structure resin-based composite material with a curing degree>97% was obtained, which is recorded as B-E-B.

Example 7

(1) Mixing up 0.13 g of aligned carbon nanotube bundles (length was 20 to 100 μm, diameter was 2 to 5 μm) without surface treatment with 20 g bisphenol A epoxy resin (brand NO. is E-51), dissolved at 60° C. for 10 minutes with ultrasonic vibration, and adding 0.8 g of 2-ethyl-4-methylimidazole, continue to stirring for 10 min, then vacuum degassed at 60° C. for 20 min to obtain prepolymer A; divided prepolymer A into two parts, poured the first prepolymer into the preheated mold, then putted the mold in a microwave oven and irradiated it for 5 cycles (the irradiation process for each cycle was medium heat, heated for 30 s, cold for 10 s), and after natural cooling, obtained the aligned carbon nanotube/epoxy cured resin composite pre-cured sheet B with 60% curing degree was.

(2) Mixing up 4 g of the polydopamine-coated barium titanate nanofibers PDA@BTnf was prepared in Example 1 with 20 g of bisphenol A epoxy resin (brand NO. was E-51), dissolved at 60° C. under ultrasonic vibration for 10 minutes, added 0.8 g of 2-ethyl-4-methylimidazole, continue to stirring for 10 minutes, then vacuum degassed at 60° C. for 20 minutes to obtain prepolymer C; scraped prepolymer film D with a thickness of 300 μm on the preheated polytetrafluoroethylene board, after curing for 1 h at 80° C., natural cooling, a barium titanate nanofiber/epoxy resin composite pre-cured sheet E with a curing degree of 60% is obtained.

(3) Soaking the pre-cured sheet E prepared in step (2) with the prepolymer A prepared in step (1), laid it flat on the pre-cured sheet B prepared in step (1) to remove air bubbles to obtain a two-layer structural composite material B-E; Then pour the other half of the prepolymer A prepared in step (1) on the side of the pre-cured sheet E of the double-layer structural composite material B-E, and then put the mold in a microwave oven, and irradiated it for 15 cycles (the irradiation process for each cycle was medium heat, heated for 30 s, cold for 10 s). After natural cooling, a three-layer structure resin-based composite material with a curing degree >97% was obtained, which is recorded as B-E-B. With a permittivity of 1072.1 (@100 Hz), and the breakdown strength reached at 4.76. If the other half of the prepolymer A in step (3) is poured on the side of the pre-cured sheet B of B-E, under the other conditions remain unchanged, the permittivity of the three-layer structure resin-based composite material B-B-E is at 798.6 (@100 Hz), breakdown strength is at 3.03.

Example 8

(1) Mixing up 0.07 g of aligned carbon nanotube bundles (length was 20 to 100 μm, diameter was 2 to 5 μm) had surface hydroxylation with 20 g bisphenol A epoxy resin (brand NO. is E-51), dissolved at 60° C. for 10 minutes with ultrasonic vibration, and adding 0.8 g of 2-ethyl-4-methylimidazole, continue to stirring for 10 min, then vacuum degassed at 60° C. for 20 min to obtain prepolymer A; divided prepolymer A into two parts, poured the first prepolymer into the preheated mold, then putted the mold in a microwave oven and irradiated it for 4 cycles (the irradiation process for each cycle was medium heat, heated for 30 s, cold for 10 s), and after natural cooling, obtained the aligned carbon nanotube/epoxy cured resin composite pre-cured sheet B with 40% curing degree was.

(2) Mixing up 2 g of the polydopamine-coated barium titanate nanofibers PDA@BTnf was prepared in Example 1 with 20 g of bisphenol A epoxy resin (brand NO. was E-51), dissolved at 60° C. under ultrasonic vibration for 10 minutes, added 0.8 g of 2-ethyl-4-methylimidazole, continue to stirring for 10 minutes, then vacuum degassed at 60° C. for 20 minutes to obtain prepolymer C; scraped prepolymer film D with a thickness of 150 μm on the preheated polytetrafluoroethylene board, after curing for 45 min at 80° C., natural cooling, a barium titanate nanofiber/epoxy resin composite pre-cured sheet E with a curing degree of 60% is obtained.

(3) Soaking the pre-cured sheet E prepared in step (2) with the prepolymer A prepared in step (1), laid it flat on the pre-cured sheet B prepared in step (1) to remove air bubbles to obtain a two-layer structural composite material B-E; Then pour the other half of the prepolymer A prepared in step (1) on the side of the pre-cured sheet E of the double-layer structural composite material B-E, and then put the mold in a microwave oven, and irradiated it for 15 cycles (the irradiation process for each cycle was medium heat, heated for 30 s, cold for 10 s). After natural cooling, a three-layer structure resin-based composite material with a curing degree>97% was obtained, which is recorded as B-E-B.

Example 9

(1) Mixing up 0.16 g of aligned carbon nanotube bundles (length was 20 to 100 μm, diameter was 2 to 5 μm) had surface hydroxylation with 20 g bisphenol A epoxy resin (brand NO. is E-51), dissolved at 60° C. for 10 minutes with ultrasonic vibration, and adding 0.8 g of 2-ethyl-4-methylimidazole, continue to stirring for 10 min, then vacuum degassed at 60° C. for 20 min to obtain prepolymer A; divided prepolymer A into two parts, poured the first prepolymer into the preheated mold, then putted the mold in a microwave oven and irradiated it for 5 cycles (the irradiation process for each cycle was medium heat, heated for 30 s, cold for 10 s), and after natural cooling, obtained the aligned carbon nanotube/epoxy cured resin composite pre-cured sheet B with 30% curing degree was.

(2) Mixing up 6 g of the polydopamine-coated barium titanate nanofibers PDA@BTnf was prepared in Example 1 with 20 g of bisphenol A epoxy resin (brand NO. was E-51), dissolved at 60° C. under ultrasonic vibration for 10 minutes, added 0.8 g of 2-ethyl-4-methylimidazole, continue to stirring for 10 minutes, then vacuum degassed at 60° C. for 20 minutes to obtain prepolymer C; scraped prepolymer film D with a thickness of 150 μm on the preheated polytetrafluoroethylene board, after curing for 1 h at 80° C., natural cooling, a barium titanate nanofiber/epoxy resin composite pre-cured sheet E with a curing degree of 30% is obtained.

(3) Soaking the pre-cured sheet E prepared in step (2) with the prepolymer A prepared in step (1), laid it flat on the pre-cured sheet B prepared in step (1) to remove air bubbles to obtain a two-layer structural composite material B-E; Then pour the other half of the prepolymer A prepared in step (1) on the side of the pre-cured sheet E of the double-layer structural composite material B-E, and then put the mold in a microwave oven, and irradiated it for 15 cycles (the irradiation process for each cycle was medium heat, heated for 30 s, cold for 10 s). After natural cooling, a three-layer structure resin-based composite material with a curing degree>97% was obtained, which is recorded as B-E-B.

Example 10

(1) Mixing up 0.19 g of aligned carbon nanotube bundles (length was 20 to 100 μm, diameter was 2 to 5 μm) without surface treatment with 20 g bisphenol A epoxy resin (brand NO. is E-51), dissolved at 80° C. for 10 minutes with ultrasonic vibration, and added 5 g of diaminodiphenylmethane, continue to stirring for 10 min, then vacuum degassed at 80° C. for 20 min to obtain prepolymer A; divided prepolymer A into two parts, poured the first prepolymer into the preheated mold, then putted the mold in a microwave oven and irradiated it for 4 cycles (the irradiation process for each cycle was medium heat, heated for 30 s, cold for 10 s), and after natural cooling, obtained the aligned carbon nanotube/epoxy cured resin composite pre-cured sheet B with 50% curing degree was.

(2) Mixing up 8 g of the polydopamine-coated barium titanate nanofibers PDA@BTnf was prepared in Example 1 with 20 g of bisphenol A epoxy resin (brand NO. was E-51), dissolved at 80° C. under ultrasonic vibration for 10 minutes, added 5 g of diaminodiphenylmethane, continue to stirring for 10 minutes, then vacuum degassed at 80° C. for 45 minutes to obtain prepolymer C; scraped prepolymer film D with a thickness of 270 μm on the preheated polytetrafluoroethylene board, after curing for 1 h at 80° C., natural cooling, a barium titanate nanofiber/epoxy resin composite pre-cured sheet E with a curing degree of 50% is obtained.

(3) Soaking the pre-cured sheet E prepared in step (2) with the prepolymer A prepared in step (1), laid it flat on the pre-cured sheet B prepared in step (1) to remove air bubbles to obtain a two-layer structural composite material B-E; Then pour the other half of the prepolymer A prepared in step (1) on the side of the pre-cured sheet E of the double-layer structural composite material B-E, and then put the mold in a microwave oven, and irradiated it for 15 cycles (the irradiation process for each cycle was medium heat, heated for 30 s, cold for 10 s). After natural cooling, a three-layer structure resin-based composite material with a curing degree>97% was obtained, which is recorded as B-E-B.

Example 11

(1) Mixing up 10 g of bismaleimido diphenylmethane with 8.6 g of diallyl bisphenol A compound were stirred and heated in a transparent solution at 130° C., and added 0.1 g of aligned carbon nanotube bundles (length was 20 to 100 μm, diameter was 2 to 5 μm) without surface treatment, prepolymerized at 140° C. for 50 min, poured into the preheated mold, vacuum degassed at 140° C. for 30 min, to obtain prepolymer A; divided prepolymer A into two parts, took the one part of it and poured it into the preheated mold, then put the mold in a microwave oven and irradiated it for 5 cycles (the irradiation process of each cycle is medium heat, heating for 30 s, and cooling for 10 s). After natural cooling, obtained the aligned carbon nanotube/bismaleimide resin composite pre-cured sheet B with 60% curing degree was.

(2) Mixing up 10 g of bismaleimido diphenylmethane with 8.6 g of diallyl bisphenol A compound were stirred and heated to a transparent solution at 130° C., and added 8 g of polydopamine-coated barium titanate nanoparticles prepared in Example 1 were added Fiber PDA@BTnf, prepolymerized at 140° C. for 50 min, poured into the preheated mold, vacuum degassed at 140° C. for 30 min, to obtain prepolymer C; scraped on the preheated PTFE board The prepolymer film D with a thickness of 250 μm was cured at 140° C. for 50 minutes, and after natural cooling, obtained the barium titanate nanofiber/bismaleimide resin composite pre-cured sheet E with 60% curing degree was.
(3) After soaking the pre-cured sheet E prepared in step (2) with the pre-polymer A prepared in step (1), lay it flat on the pre-cured sheet B prepared in step (1) to remove air bubbles to obtain a two-layer structural composite material BE; Then pour the other half of the prepolymer A prepared in step (1) on the side of the pre-cured sheet E of the double-layer structural composite material BE, and then put the mold in a microwave oven, and irradiate it for 15 cycles (the irradiation process for each cycle was medium heat, heated for 30 s, cold for 10 s), and after natural cooling, a three-layer structure resin-based composite material with a curing degree of >97% is obtained, denoted as BEB, with a dielectric constant of 1062.8 (@100 Hz), and the breakdown strength reaches at 4.79. If step (1) and step (3) were used for non-intermittent microwave irradiation and other conditions remain unchanged, the dielectric constant of the three-layer resin-based composite BEB obtained is 882.6 (@100 Hz) and the breakdown strength is 3.62; if Replace step (1) and step (3) with heating method (curing 60 min at 160° C.) instead of intermittent microwave method, and other conditions remain unchanged, the dielectric constant of the obtained three-layer resin-based composite material BEB is 738.8 (@100 Hz)), the breakdown strength is 3.38.

Example 12

(1) Mixing up 10 g of bismaleimido diphenylmethane with 8 g of diallyl bisphenol A compound were stirred and heated in a transparent solution at 130° C., and added 0.37 g of aligned carbon nanotube bundles (length was 20 to 100 μm, diameter was 2 to 5 μm) without surface treatment, prepolymerized at 140° C. for 50 min, pour into the preheated mold, degas in vacuum at 140° C. for 30 min to obtain prepolymer A; divide prepolymer A into two parts, poured on part into the preheated mold, then put the mold in a microwave oven, and irradiated it for 5 cycles (the irradiation process of each cycle is medium heat, heating for 30 s, and cooling for 10 s). After natural cooling, obtained the aligned carbon nanotube/bismaleimide resin composite pre-cured sheet B with 60% curing degree was.
(2) Mixing up 10 g of bismaleimido diphenylmethane and 8 g of diallyl bisphenol A compound were stirred and heated at 130° C. to a transparent solution, and then 4 g of polydopamine-coated barium titanate nanofibers prepared in Example 1 were added PDA@BTnf, prepolymerized at 140° C. for 50 min, poured into the preheated mold, vacuum degassed at 140° C. for 30 min, to obtain prepolymer C; scrape the thickness on the preheated PTFE board The 200 μm prepolymer film D was cured at 140° C. for 50 minutes, and after natural cooling, obtained the barium titanate nanofiber/bismaleimide resin composite pre-cured sheet E with 60% curing degree was.
(3) After soaking the pre-cured sheet E prepared in step (2) with the pre-polymer A prepared in step (1), laid it flat on the pre-cured sheet B prepared in step (1) to remove air bubbles to obtain a two-layer structural composite material BE; Then pour the other half of the prepolymer A prepared in step (1) on the side of the pre-cured sheet E of the double-layer structural composite material BE, and then put the mold in a microwave oven, and irradiate it for 15 cycles (the irradiation process for each cycle was medium heat, heated for 30 s, cold for 10 s), and after natural cooling, a three-layer structure resin-based composite material with a curing degree>97% is obtained, which is recorded as B-E-B.

The invention claimed is:

1. A method for preparing a resin-based composite material having a three-layer structure, comprising the following steps:
(1) mixing a curable resin system with aligned carbon nanotubes to obtain an aligned carbon nanotubes prepolymer, dividing the aligned carbon nanotubes prepolymer into a first prepolymer and a second prepolymer, precuring the first prepolymer to obtain a pre-cured aligned carbon nanotube sheet;
(2) mixing the curable resin system with polydopamine-coated barium titanate nanofibers to obtain a barium titanate nanofiber prepolymer, curing the barium titanate nanofiber prepolymer to obtain a pre-cured barium titanate nanofiber sheet; and
(3) soaking the pre-cured barium titanate nanofiber sheet in the second prepolymer, laying flat the soaked pre-cured barium titanate nanofiber sheet on the pre-cured aligned carbon nanotube sheet, pouring the second prepolymer on the soaked pre-cured barium titanate nanofiber sheet, and then curing to obtain the resin-based composite material having a three-layer structure.

2. The method according to claim 1, wherein in step (1), an amount of the aligned carbon nanotubes is 0.1 to 2 wt % of the curable resin system, and an amount of the first prepolymer is equal to an amount of the second prepolymer; and in step (2), an amount of the polydopamine-coated barium titanate nanofibers is 10 to 40 wt % of the curable resin system.

3. The method according to claim 1,
wherein the curable resin system comprises a resin or a resin and a curing agent, and
wherein the method further comprises:
(1) mixing a barium salt and a titanate compound in a solvent, adding a viscosity modifier to obtain a precursor solution, electrospinning and calcining the precursor solution to obtain barium titanate nanofibers; and
(2) dissolving dopamine hydrochloride and trimethylol aminomethane hydrochloride in water, adjusting a pH value to 8 to 9 with an alkaline solution, and adding the barium titanate nanofibers to react at room temperature for 24 h and to obtain the polydopamine-coated barium titanate nanofibers.

4. The method according to claim 3, wherein the resin is a bismaleimide resin, a cyanate ester resin, an epoxy resin, or a polyimide resin; the barium salt is barium acetate; the titanate compound is tetrabutyl titanate; the solvent is acetic acid, and the viscosity modifier is polyvinylpyrrolidone; the electrospinning is conducted at 1.7 kV/cm; the calcining is conducted at a heating rate of 10° C./min and at 700° C. for 3 h under air atmosphere; the alkaline solution is an aqueous sodium hydroxide solution.

5. The method according to claim 3, wherein a molar ratio of the barium salt to the titanate compound is 1:1; a weight ratio of dopamine hydrochloride, trimethylaminomethane hydrochloride, water and the barium titanate nanofibers is 0.2:0.1:100:2.

6. The method according to claim 1, wherein a thickness of the pre-cured barium titanate nanofiber sheet is 50 to 1000 μm; and the pre-cured barium titanate nanofiber sheet is formed by a coating method.

7. The method according to claim 1, wherein a curing degree of the pre-cured aligned carbon nanotube sheet is 30% to 60%; and a curing degree of the pre-cured barium titanate nanofiber sheet is 30% to 60%.

8. The method according to claim 1, wherein in step (1), the first prepolymer is cured by microwave intermittent curing; and in step (3), the resin-based composite material having a three-layer structure is cured by microwave intermittent curing.

9. The method according to claim 8, wherein the microwave intermittent curing is carried for 10 to 30 seconds each time with an intermittent time of 5 to 15 seconds.

* * * * *